(12) United States Patent
Viswanathan et al.

(10) Patent No.: US 11,561,907 B2
(45) Date of Patent: Jan. 24, 2023

(54) ACCESS TO DATA STORED IN QUARANTINED MEMORY MEDIA

(71) Applicant: Micron Technology, Inc., Boise, ID (US)

(72) Inventors: Radhika Viswanathan, Boise, ID (US);
Bhumika Chhabra, Boise, ID (US);
Carla L. Christensen, Boise, ID (US);
Zahra Hosseinimakarem, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 245 days.

(21) Appl. No.: 16/996,802

(22) Filed: Aug. 18, 2020

(65) Prior Publication Data

US 2022/0058139 A1 Feb. 24, 2022

(51) Int. Cl.
G06F 12/14 (2006.01)
G06F 21/31 (2013.01)
G06F 21/79 (2013.01)

(52) U.S. Cl.
CPC ...... G06F 12/1483 (2013.01); G06F 12/1441 (2013.01); G06F 21/31 (2013.01); G06F 21/79 (2013.01)

(58) Field of Classification Search
CPC ... G06F 12/1483; G06F 12/1441; G06F 21/79
USPC ........................................................ 711/163
See application file for complete search history.

(56) References Cited

U.S. PATENT DOCUMENTS

| | | | |
|---|---|---|---|
| 10,437,723 B2 | 10/2019 | Berger et al. | |
| 2008/0278285 A1* | 11/2008 | Matsushima | .... G11B 20/00695 340/5.74 |
| 2010/0088759 A1 | 4/2010 | Abzarian et al. | |
| 2012/0110238 A1 | 5/2012 | Blawat | |
| 2015/0016693 A1* | 1/2015 | Gattuso | ............... G06V 40/16 382/118 |
| 2015/0082062 A1* | 3/2015 | Saraswat | .................. G11C 5/14 713/323 |

(Continued)

FOREIGN PATENT DOCUMENTS

WO 2020-139534 A1 7/2020

OTHER PUBLICATIONS

International Search Report and Written Opinion from related international patent application No. PCT/US2021/041962, dated Nov. 2, 2021, 10 pages.

*Primary Examiner* — Edward J Dudek, Jr.
*Assistant Examiner* — Sidney Li
(74) *Attorney, Agent, or Firm* — Brooks, Cameron & Huebsch, PLLC

(57) ABSTRACT

Methods and apparatuses related to access to data stored in quarantined memory media are described. Memory systems can include multiple types of memory media (e.g., volatile and/or non-volatile) and data (e.g., information included in) stored in the memory media often are subject to risks of the data being undesirably exposed to the public. For example, requests to write data in the memory media can often be made and accepted without a user's awareness, which can lead to the undesirable exposure of the data. According to embodiments of the present disclosure, a particular portion and/or location in the memory media can provide a data protection scheme such that data stored in the particular location can be refrained from being transferred out of the computing system.

23 Claims, 4 Drawing Sheets

(56) References Cited

U.S. PATENT DOCUMENTS

Figure 1:
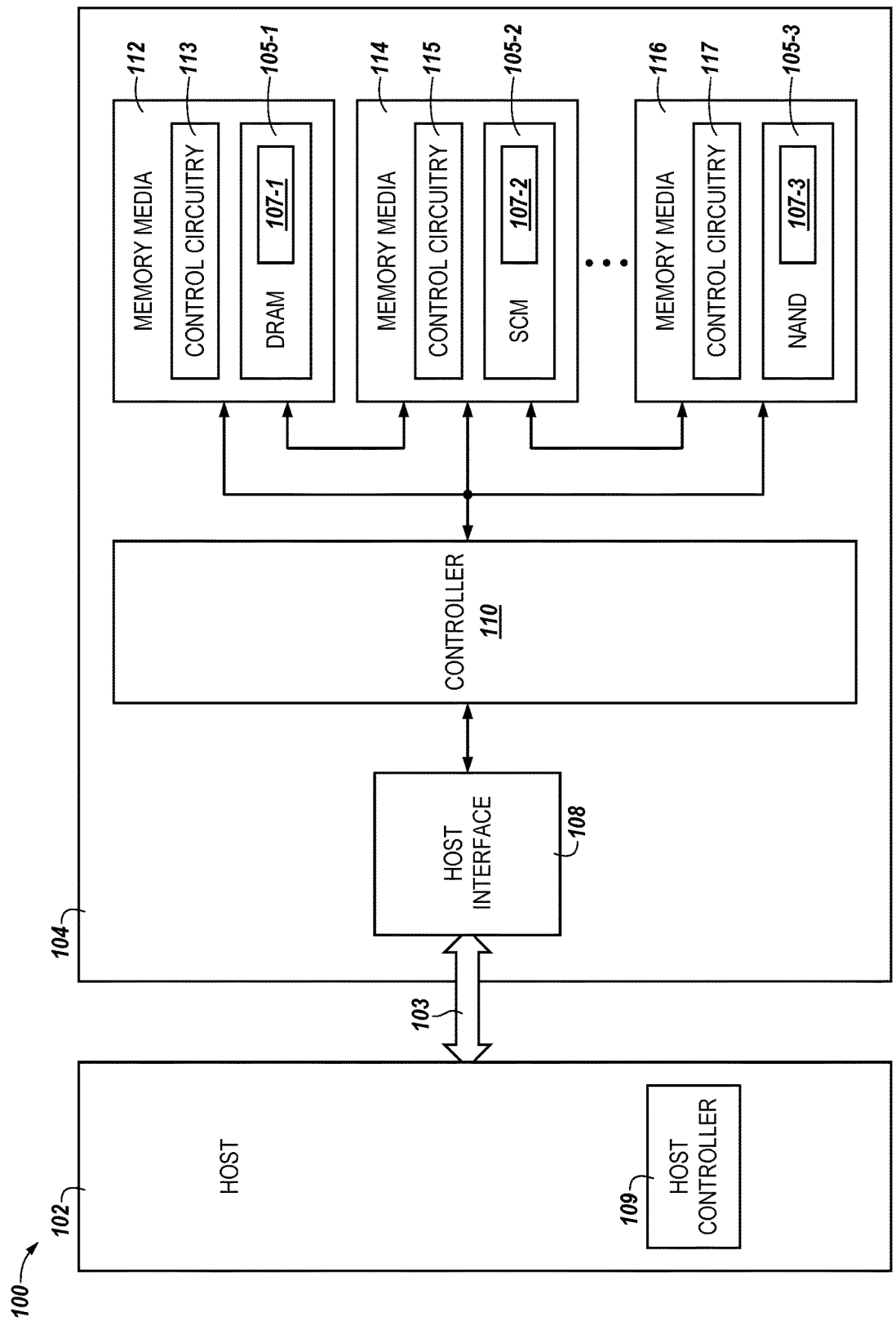

| | | |
|---|---|---|
| 2019/0019176 A1 | 1/2019 | Aabye |
| 2019/0042798 A1 | 2/2019 | Mittal |
| 2019/0349377 A1 | 11/2019 | Keene et al. |
| 2020/0162474 A1 | 5/2020 | Zou et al. |
| 2020/0204438 A1 | 6/2020 | Narasimhan et al. |
| 2020/0236109 A1 | 7/2020 | Steinberg et al. |
| 2020/0250334 A1 | 8/2020 | Bandi et al. |

\* cited by examiner

ACCESS TO DATA STORED IN QUARANTINED MEMORY MEDIA

TECHNICAL FIELD

The present disclosure relates generally to semiconductor memory and methods, and more particularly, to methods and apparatuses for access to data stored in quarantined memory media.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices can be coupled to a host (e.g., a host computing device) to write (e.g., store) data, commands, and/or instructions for use by the host while the computer or electronic system is operating. For example, data, commands, and/or instructions can be transferred between the host and the memory device(s) during operation of a computing or other electronic system.

BRIEF DESCRIPTION OF THE DRAWINGS

FIG. 1 is a functional block diagram in the form of a computing system including an apparatus in the form of a memory system in accordance with a number of embodiments of the present disclosure.

FIG. 2 is a functional block diagram in the form of a computing system including multiple memory media in accordance with a number of embodiments of the present disclosure.

FIG. 3 is a diagram of a memory system including multiple memory media coupled to a host in the form of a mobile device in accordance with a number of embodiments of the present disclosure.

FIG. 4 is a flow diagram of a method for accessing data stored in quarantined memory media in accordance with a number of embodiments of the present disclosure.

FIG. 5 is another flow diagram of a method for accessing data stored in quarantined memory media in accordance with a number of embodiments of the present disclosure.

DETAILED DESCRIPTION

Methods and apparatuses related to access to data stored in quarantined memory media are described. Memory systems can include multiple types of memory media (e.g., volatile and/or non-volatile) and data (e.g., information included in) stored in the memory media often are subject to risks of the data being undesirably exposed to the public. For example, requests to write data to the memory media can often be made and accepted without a user's awareness, which can lead to the undesirable exposure of the data. According to embodiments of the present disclosure, a particular portion and/or location in the memory media can provide a data protection scheme such that data stored in the particular location can be refrained from being transferred out of the computing system.

A computing system including memory systems can include one or more different memory media types which can be used to write data in a computing system. Such data can be transferred between a host associated with the computing system and the memory system. The data written in memory media can be important or even critical to operation of the computing system and/or the host. There are various types of memory media, and each type of memory media includes characteristics that may be unique to the memory media type. As used herein, types of memory media can include, among others, non-volatile memory and volatile memory.

For example, non-volatile memory can provide persistent data by retaining written data when not powered, and non-volatile memory types can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory (e.g., 3D XPoint™), resistive random access memory (RRAM), ferroelectric random access memory (FeRAM), magnetoresistive random access memory (MRAM), and programmable conductive memory, among other types of memory. Volatile memory can require power to maintain its data (e.g., host data, error data, etc.), and volatile memory types can include random-access memory (RAM), dynamic random access memory (DRAM), and static random access memory (SRAM), among others. The characteristics of different memory media types can include features that cause tradeoffs related to performance, storage density, energy requirements read/write speed, cost, etc. In some examples, some memory media types may be faster to read/write as compared to other memory media types but less cost effective than other memory media types. In other examples, memory media types may be faster as compared to other memory media types but consume a large amount of power and reduce the life of a battery, while other memory media types can be slower and consume less power.

Often, applications run on the host can grant permission to access data (e.g., image data) stored in the memory media. In this case, even when the host includes various data protection scheme (e.g., data encryption) that refrains data from being illegitimately retrieved (e.g., transferred) out of the host, the data protection scheme can be undesirably, but legitimately, nullified (e.g., in contrast to user's intent) and the data can be undesirably leaked and/or exposed. As an example, the host and the memory media can be (e.g., legitimately) programmed in a way that the applications run on the host are permitted to access the data stored in the memory media, in contrast to the user's intent. In this event, even though the user may not desire the data to be exposed, the data can be undesirably accessed by applications associated with a cloud system and/or social networking service (SNS), which can lead to undesired exposure of the data to, for example, the public.

In contrast, embodiments herein can allow a computing system to limit (e.g., limitedly allow) and/or refrain requests to access data stored in a particular location of the computing system. Accordingly, data including sensitive information and/or information that is undesired to be exposed to another party can be selectively and/or automatically stored in the particular location and protected against various attacks and/or undesired (but legitimate) requests. As used herein, the term "location" refers to a portion and/or an area corresponding to a number of memory cells that are configured to store data.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, designators such as "N," etc., particularly with respect to reference numerals in the drawings, indicate that a number of the particular feature so designation can be included. It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures can be identified by the use of similar digits. For example, 102 can reference element "02" in FIG. 1, and a similar element can be referenced as 202 in FIG. 2. A group or plurality of similar elements or components can generally be referred to herein with a single element number. For example, a plurality of reference elements 230-1, ..., 230-N (e.g., 230-1 to 230-N) can be referred to generally as 230. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional block diagram in the form of a computing system 100 including an apparatus including a memory system 104 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. The memory system 104 can include a host interface 108, a controller 110, (e.g., a processor, control circuitry, hardware, firmware, and/or software) and a number of memory media devices each including control circuitry.

The host 102 can be a host system such as a personal laptop computer, a vehicle, a desktop computer, a digital camera, a mobile telephone, an internet-of-things (IoT) enabled device, or a memory card reader, graphics processing unit (e.g., a video card), among various other types of hosts. The host 102 can include a system motherboard and/or backplane and can include a number of memory access devices such as a number of processing resources (e.g., one or more processors, microprocessors, image processor, and/or some other type of controlling circuitry). One of ordinary skill in the art will appreciate that "a processor" can intend one or more processors, such as a parallel processing system, a number of coprocessors, etc. The host 102 can be coupled to a host interface 108 of the memory system 104 by a communication channel 103.

As used herein an "IoT enabled device" can refer to devices embedded with electronics, software, sensors, actuators, and/or network connectivity which enable such devices to connect to a network and/or exchange data. Examples of IoT enabled devices include mobile phones, smart phones, tablets, phablets, computing devices, implantable devices, vehicles, home appliances, smart home devices, monitoring devices, wearable devices, devices enabling intelligent shopping systems, among other cyber-physical systems.

The host 102 can be responsible for executing an operating system for a computing system 100 that includes the memory system 104. Accordingly, in some embodiments, the host 102 can be responsible for controlling operation of the memory system 104. For example, the host 102 can execute instructions (e.g., in the form of an operating system) that manage the hardware of the computing system 100 such as scheduling tasks, executing applications, controlling peripherals, etc.

In some embodiments, the applications running on the computing system 100 may request access to data stored in the memory system 104 such as in a plurality of memory media 112, 114, and/or 116. Such a request can be made in various manners. For example, the request can be made explicitly such that a user handling the computing system 100 (e.g., host 102) may be aware of the request made by the applications. In another example, the request can be made implicitly and/or may have been already accepted by the host 102 without the user being aware of the request. Accordingly, though the user has not given an explicit permission to do so, the application can still access the data stored in the plurality of memory media 112, 114, and/or 116 and the accessed data may be exposed to a public undesirably, but legitimately.

Therefore, providing a data protection scheme against undesired but legitimately made requests is of importance. Embodiments provides such data protection scheme by writing data to a particular location of the memory system 104 and providing a higher degree of a data protection scheme to the data stored in the particular location, which can be referred to as a quarantined location. As used herein, the term "quarantined location" refers to a location within and/or among multiple memory media that is quarantined and provided a higher degree of data protection from other locations, which can be referred to as non-quarantined location. For example, data stored in the quarantined location (e.g., quarantined locations 107-1, 107-2, and/or 107-3) can be entirely refrained from being transferred out of a computing system (e.g., computing system 100), while data stored in the non-quarantined location can be allowed to be transferred out of the computing system. As an example, the data stored in the quarantined location can be refrained from being transferred out of the computing system regardless of a type of and/or a nature of requests made for accessing the data.

A non-limiting example of multiple memory media having various types are described in FIG. 1. For example, as illustrated in FIG. 1, the memory system can include memory media such as memory media 112 including control circuitry 113 and an array of DRAM memory cells 105-1, memory media 114 including control circuitry 115 and an array of SCM memory cells 105-2, and memory media 116 including control circuitry 117 and an array of NAND memory cells 105-3. While three memory media types (e.g., DRAM 105-1, SCM 105-2, and/or NAND 105-3) are illustrated, embodiments are not so limited, however, and there can be more or less than three memory media types. Further, the types of memory media (e.g., types of arrays of memory cells) are not limited to the three specifically illustrated (e.g., DRAM 105-1, SCM 105-2, and/or NAND 105-3) in FIG. 1, other types of volatile and/or non-volatile memory media types are contemplated. In a number of embodiments, the controller 110, the memory media 112, 114, and 116, and/or the host interface 108 can be physically located on a single die or within a single package, (e.g., a managed memory application). Also, in a number of embodiments, a plurality of memory media (e.g., memory media 112, 114, and/or 116), can be included on a single memory system 104. Also, in some embodiments, more than one memory media can include a same type of array of memory cells. For example, instead of memory media 112 having an array of DRAM memory cells and memory media 114 having an array of SCM memory cells, both memory media 112 and 114 can have an array of SCM memory cells.

At least one of the plurality of memory media can include a quarantined location. As a non-limiting example as illustrated in FIG. 1, the array of each memory media can include a quarantined location. For example, the memory media 112, 114, and 116 can include quarantined locations 107-1 (included within the DRAM array 105-1), 107-2 (included within the SCM array 105-2), and 107-3 (included within the NAND array 105-3), respectively. In a number of embodiments, access to data stored in the quarantined location can be entirely refrained and/or limited, which can refrain applications (e.g., that may have been granted permission to access the data) from accessing the data stored in the quarantined location and protect the data against the undesirable exposure to a public.

Although FIG. 1 illustrates that a quarantined location is located as a portion of each memory media 112, 114, and 116, various and/or different locations of the memory media 112, 114, and/or 116 can be configured as a quarantined location. For example, one of the memory media 112, 114, and/or 116 can include a quarantined location, while other memory media 112, 114, and/or 116 do not include. For example, unlike how it is illustrated in FIG. 1, in which only a portion of the memory media is configured as a quarantined location, the entire memory media can be configured as a quarantined location.

As illustrated in FIG. 1, the controller 110 can be coupled to the host interface 108 and to the memory media DRAM 112, SCM, 114, and NAND 116 via one or more channels and can be used to transfer data between the memory system 104 and a host 102 having a host controller 109. The host interface 108 can be in the form of a standardized interface. For example, when the memory system 104 is used for data storage in a computing system 100, the interface 108 can be a serial advanced technology attachment (SATA), peripheral component interconnect express (PCIe), or a universal serial bus (USB), a double data rate (DDR) interface, among other connectors and interfaces. In general, however, interface 108 can provide an interface for passing control, address, data, and other signals between the memory system 104 and a host 102 having compatible receptors for the host interface 108.

The computing system 100 can include separate integrated circuits or the host 102, the memory system 104, the host interface 108, the controller 110, and/or the memory media DRAM 112, SCM 114, and/or NAND 116 can be on the same integrated circuit. The computing system 100 can be, for instance, a server system and/or a high-performance computing (HPC) system and/or a portion thereof. Although the example shown in FIG. 1 illustrates a system having a Von Neumann architecture, embodiments of the present disclosure can be implemented in non-Von Neumann architectures, which may not include one or more components (e.g., CPU, ALU, etc.) often associated with a Von Neumann architecture.

In some embodiment, the computing system 100 (e.g., host 102) can be in one of a number of operation modes, which can determine whether data received at the computing system 100 is to be stored in a quarantined location or a non-quarantined location of the plurality of memory media 112, 114, and/or 116. For example, a user may put the computing system 100 into a first operation mode (e.g., public operation mode) and data generated, obtained, and/or received during the first operation mode can be transferred to and stored in the non-quarantined locations 107-1, 107-2, and/or 107-3. In another example, a user may put the computing system 100 into a second operation mode (e.g., private operation mode), and data generated, obtained, and/or received during the second operation mode can be transferred to and stored in the quarantined locations 107-1, 107-2, and/or 107-3.

In some embodiment, data received at the computing system 100 can include (e.g., one or more) attributes, which can be input to a setting that determines whether the data is to be stored in a quarantined location or a non-quarantined location of memory media (e.g., memory media 112, 114, and/or 116). As used herein, the term "setting" refers to a deterministic guideline to direct data to a particular location among memory media. For example, a setting can compare the attributes to corresponding thresholds and can determine whether each of the attributes is above or below a corresponding threshold, which can further determine whether the data is to be stored in a quarantined location or a non-quarantined location. The controller 110 and/or the host controller 109 can be configured to apply one or more settings to incoming data.

As used herein, the term "attributes" refers to aspects of the image data, which can relate to, for example, user's desire whether the data stored in the memory system 104 can be made available to a public. Examples of the attributes can include a nature of information included within data (e.g., and/or a subject included within image data), a geological location of the computing system 100 when and/or a time at which (e.g., or a period during which) the data were generated, obtained, and/or received. These attributes can indicate a degree of privacy, which determines whether to write data to a quarantined or in a non-quarantined location.

In some embodiments, a threshold can be pre-established (e.g., predetermined) and/or altered based on input from a user (e.g., host 102). As used herein, the term "input" refers to information about attributes included in the image data.

An input can be a calibration process where a user (of the host 102) establishes a threshold related to the attribute. For example, the input can be a user identifying whether particular data (e.g., image data) is to be stored in a quarantined location or a non-quarantined location. Based on the input, the controller 110 and/or the host controller 109 can identify a pattern shown by (e.g., underlying) multiple inputs from a user and can alter the pre-established threshold of a setting to better accommodate user's preferences. Further details associated with identifying a pattern underlying inputs from a user and applying the pattern to alter a pre-existing setting are described below.

Figure 2:
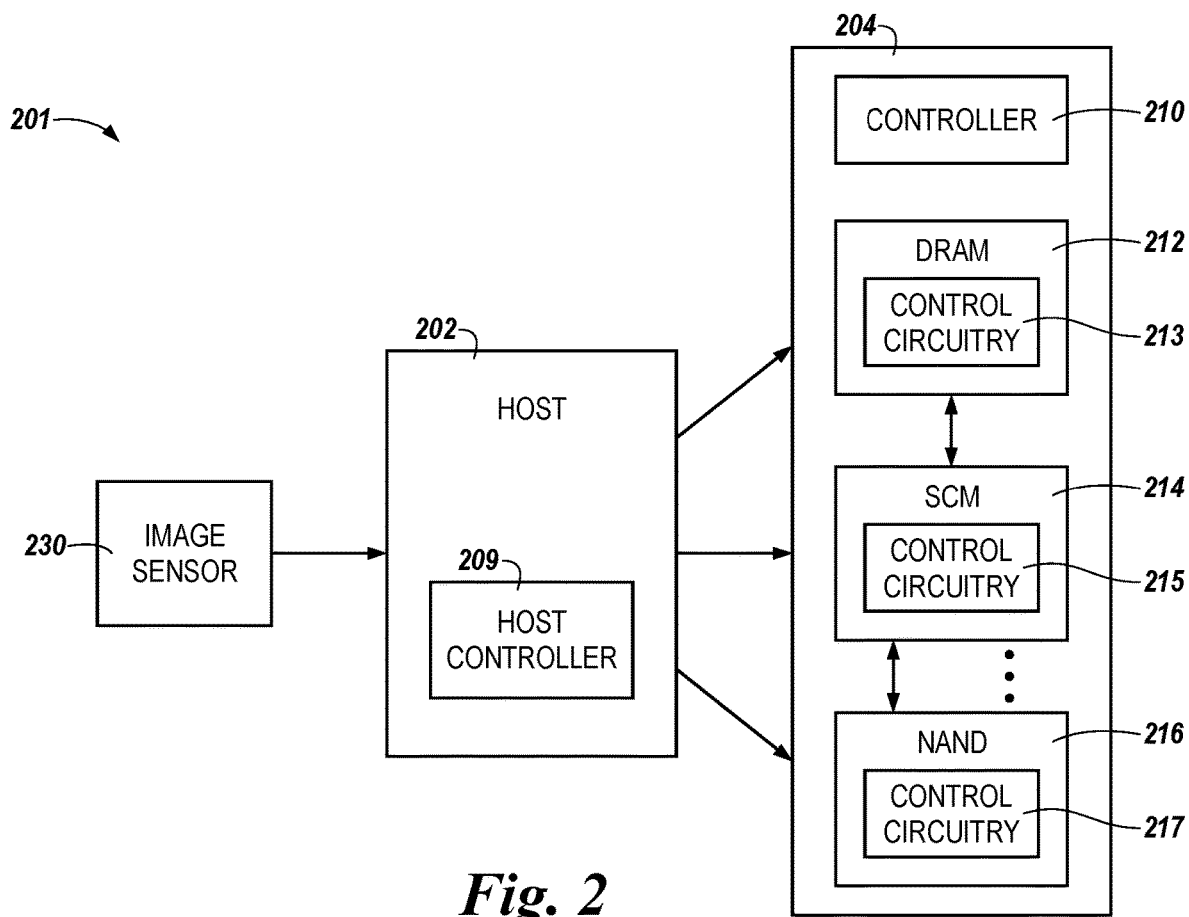

FIG. 2 is a functional block diagram in the form of a computing system 201 including multiple memory media types in accordance with a number of embodiments of the present disclosure. FIG. 2 illustrates a computing system 201 which includes a host 202, including a host controller 209 which can be analogous to the host 102 and host controller 109 described in connection with FIG. 1. Computing system 201 includes a controller 210 which can be analogous to the controller 110 described in connection with FIG. 1. The computing system 201 can include image sensor 230, which can be communicatively coupled to the host 202 and produce image data.

As illustrated in FIG. 2, the memory system 204 can include memory media, such as memory media 212 including control circuitry 213 and an array of DRAM memory cells 205-1, memory media 214 including control circuitry 215 and array of SCM memory cells 205-2, and memory media 216 including control circuitry 217 and array of NAND memory cells 205-3 that can be analogous to memory media 112, 114, and 116, respectively, as described in connection with FIG. 1.

At least one of the plurality of memory media can include a quarantined location. As a non-limiting example as illustrated in FIG. 2, the array of each memory media can include a quarantined location. For example, the memory media 212, 214, and 216 can include quarantined locations 207-1 (included within the DRAM array 205-1) 207-2 (included within the SCM array 205-2), and 207-3 (included within the NAND array 205-3), respectively. Although FIG. 2 illustrates that a quarantined location is located as a portion of each memory media 212, 214, and 216, various and/or different locations of the memory media 212, 214, and 216 can be configured as a quarantined location. For example, one of the memory media 212, 214, and/or 216 can include a quarantined location, while other memory media 212, 214, and/or 216 do not include a quarantined location. For example, unlike how it is illustrated in FIG. 2, in which only a portion of the memory media is configured as a quarantined location, the entire memory media can be configured as a quarantined location.

The host 202 can be communicatively coupled to the sensors 230 via a physical connection (e.g., via wiring, circuitry, etc.) or remotely coupled (e.g., via a wireless signal, near field communication, Bluetooth, Bluetooth Low Energy, RFID, etc.). The host 202 can be communicatively coupled to one or more memory media types. FIG. 2 illustrates a non-limiting example of multiple memory media types in the form of a DRAM 212 including control circuitry 213, SCM 214 including control circuitry 215, and a NAND 216 including control circuitry 217. The host 202 can receive the image data generated by the image sensor 230. In some embodiments, the host 202 can be a mobile device (e.g., a smart phone) with a display that can display image data (e.g., received via the image sensor 230 (e.g., camera) to a user.

In a number of embodiments, access to data stored in the quarantined location can be entirely refrained and/or limited, which can refrain applications (e.g., that may have been granted permission to access the data) from accessing the data stored in the quarantined location and protect the data against the undesirable exposure to a public. As described herein, whether to write data received at the computing system 201 can be based on one or more pre-established settings (e.g., each with respective one or more pre-established thresholds), which (e.g., whose corresponding threshold) can be altered based on inputs and/or a pattern identified from the inputs received from a user of the host 202.

The inputs (e.g., form a user and/or host 202) can indicate which attributes of the image data deem important and/or private to a user. For example, user's inputs can include user switching between a first operation mode (e.g., public operation mode) and a second operation mode (e.g., private operation mode). For example, user's inputs can include user indicating particular data stored in a quarantined location to be stored in (e.g., transferred to) a non-quarantined location, and vice versa, which classifies data that has been classified as public data to private data, or data that has been classified as private data to public data. As used herein, the term "public data" can refer to data stored in a non-quarantined location, while the term "private data" can refer to data stored in a quarantined location.

There may be a pattern underlying user's inputs, and the host controller 209 and/or controller 210 can be configured to identify the pattern and utilized the pattern to generate settings and/or alter existing settings, as described below. For example, a user's inputs may indicate a pattern that image data such as photographs (e.g., generated by a camera, such as image sensor 230) taken while the user is at a workplace and/or home are to be stored in a quarantined location. Then, the controller 210 and/or host controller 209 can generate and/or alter a setting such that the setting directs photographs that were generated, obtained, and/or received while the user is at such private places to be automatically stored in the quarantined location even without user's explicit direction to do so. For example, regardless of a place a user is located, user's inputs may indicate a pattern that photographs having a particular subject (e.g., a person and/or an animal that the user does not desire to be exposed to others) is to be stored in a quarantined location. Then, the controller 210 and/or host controller 209 can generate and/or alter a setting such that the setting directs photographs including the particular subject to be stored in the quarantined location even without user's explicit direction to do so. For example, a user's inputs may indicate a pattern that photographs generated at particular time and/or during a particular period (e.g., 9 am to 5 pm) are to be stored in the quarantined location. Then, the controller 210 and/or host controller 209 can generate and/or alter a setting such that the setting directs photographs taken at the particular time and/or during the particular period to be stored in the quarantined location.

In some embodiments, a pattern underlying inputs from a user and/or host 202 can indicate that existing setting can be discarded. For example, user's inputs may indicate a pattern that photographs generated during a particular period (e.g., 9 am to 5 pm) are to be stored in the non-quarantined location. Then, the controller 210 and/or host controller 209 can discard an existing setting that previously directed photographs generated during that period to be stored in the quarantined location.

The pattern underlying and identified from multiple inputs from a user can further alter a threshold of a setting that may have been pre-established. For example, user's inputs may indicate a pattern that photographs taken during 7 am to 3 pm to be stored in a quarantined location. In the same example, a setting with a previously threshold of 9 am to 5 pm can be altered to have a threshold of 7 am to 3 pm based on the newly-identified pattern.

Each time a setting is to be generated, altered, and/or discarded, the controller 210 and/or the host controller 209 can transmit a prompt to the host 202 and/or a user of the host 202 to alert the generation and/or alternation. The prompt can be accepted and/or rejected by the user. When accepted, the controller 201 and/or the host controller 209 can proceed with generating and/or altering the setting. When rejected, the controller 201 and/or the host controller 209 can discard the generation and/or alteration suggested via the prompt and operate the computing system 201 without the suggested generation and/or alteration.

In some embodiments, a prompt can be transmitted (e.g., by the controller 210 and/or the host controller 209) to a user each time a determination is to be made on whether received data (e.g., image data) is to be stored in the quarantined location and/or the non-quarantined location. For example, when a photograph is taken and corresponding image data is received at the computing system 201 (e.g., host 202), a prompt may be transmitted and appeared in a display of the computing system 201, which can give a user to select where to write the image data (e.g., to the quarantined location or non-quarantined location).

In a non-limiting example, an apparatus (e.g., computing system 201 and/or memory system 204) can include a plurality of memory media (e.g., memory media 212, 214, and/or 216) and a controller (e.g., host controller 209 and/or controller 210) coupled to the plurality of memory media. At least two of the plurality of memory media can be different types of memory media (e.g., DRAM, SCM, and/or NAND as described herein). The controller can be configured to receive a plurality of image data and write first mage data to a first location of the plurality of memory media and second image data to a second location of the plurality of memory media. In response to receipt a request to transfer the plurality of image data out of the apparatus, the controller can be further configured to allow the first image data to be transferred out of the apparatus (e.g., in response to the first image data being stored in the first location) and refrain the second image from being transferred out of the apparatus (e.g., in response to the second image data being stored in the second location). In some embodiments, the first location can be a non-quarantined location and the second location can be a quarantined location (e.g., 207-1, 207-2, and/or 207-3).

The request to access and/or transfer the plurality of image data out of the apparatus can be a request to transfer the plurality of image data to a different memory device located external to the apparatus (e.g., computing system 201 and/or memory system 204). For example, the different memory device can be a network attached storage (NAS) device and/or located in a data center that are often associated with SNS and/or cloud system. Accordingly, image data (e.g., second image data) stored in a quarantined location (e.g., second location) can be refrained from being uploaded to the SNS and/or cloud system.

In some embodiments, the second image data stored in the second location (e.g., quarantined location) can be allowed to be transferred if a corresponding request is to transfer the second image data to a different location within the apparatus. In this example, the different location can include a different location within the same memory media (e.g., where the second location is located), a different memory media, controller 210, and/or host 202 (e.g., host controller 209).

In some embodiments, the first location and the second location can be located and included in a same memory media (e.g., first memory media) of the plurality of memory media. In some embodiments, the first location can be located and included in a first memory media, while the second location can be located and included in a second memory media of the plurality of memory media.

In another non-limiting example, an apparatus (e.g., computing system 201 and/or memory system 204) can include a plurality of memory media (e.g., memory media 212, 214, and/or 216). In this example, at least two of the plurality of memory media can be different types (e.g., DRAM, SCM, and/or NAND as described herein) of memory media, and at least one of the plurality of memory media can include a quarantined location (e.g., 207-1, 207-2, and/or 207-3) and a request to access data stored in the quarantined portion can be limited. The apparatus can further include a controller (e.g., host controller 209 and/or controller 210) coupled to the plurality of memory media, and the controller can be configured to receive image data and write the image data to the quarantined location of the at least one of the plurality of memory media. The controller can be further configured to reject a request to transfer the image data out of the apparatus such that the image data is refrained, while the image data is allowed to be transferred within the apparatus, from being transferred out of the apparatus. Stated differently, the image data that is stored in a quarantined location (e.g., 207-1, 207-2, and/or 207-3) can be allowed to be transferred to other (e.g., quarantined locations of) memory media, controller 210 and/or host 202, but can be refrained from being transferred out of the computing system 201.

In contrast to data stored in the quarantined location, data stored in a non-quarantined location can be not refrained (e.g., allowed) from being transferred out of the apparatus. Various types of settings can be pre-established (e.g., with respective pre-established thresholds) and applied to data received at the controller. For example, absent an indication that the image data is to be stored in the non-quarantined location, the image data received at the controller can be automatically transferred to and stored in the quarantined location of the at least one of the plurality of memory media. For example, absent an indication that the image data is to be stored in the quarantined location, the image data received at the controller can be automatically transferred to and stored in the non-quarantined location of the at least one of the plurality of memory media.

In some embodiments, the controller can be configured to write the image data to the quarantined location of the at least one of the plurality of memory media in response to one or more attributes of the image data being less than a threshold. As described herein, new settings can be generated and/or thresholds of existing settings can be altered. For example, the controller can be configured to receive one or more inputs indicating whether the image data with the one or more attributes is to be stored in the quarantined location or non-quarantined location of at least one of the plurality of memory media. The controller can be further configured to identify a pattern underlying the one or more inputs, and adjust the threshold based on the pattern.

Figure 3:
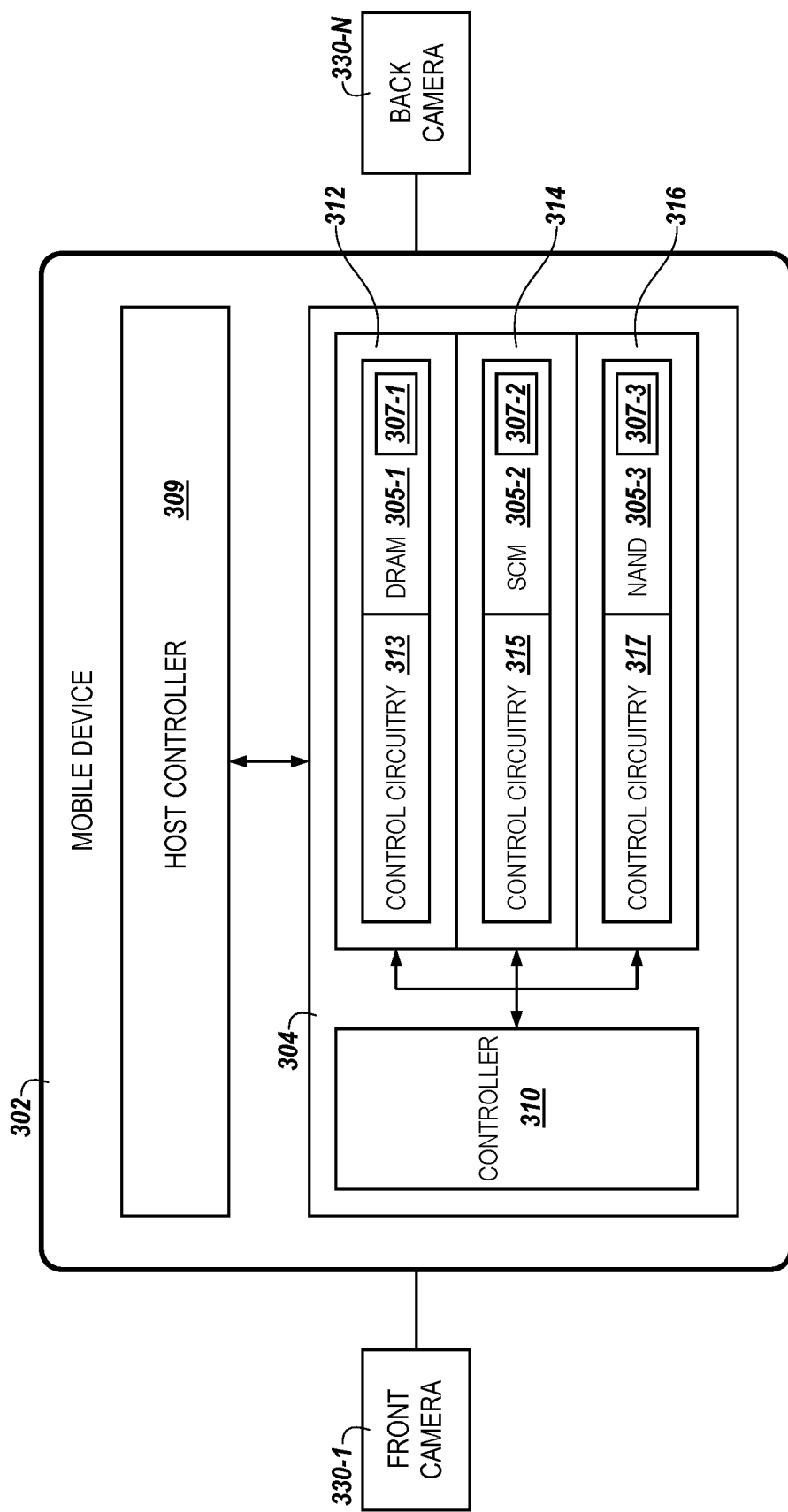

FIG. 3 is a diagram of a memory system 304 including multiple memory media types coupled to a host 302 in the form of a mobile device in accordance with a number of embodiments of the present disclosure. The host 302 can include a host controller 309 which can be analogous to the host 102 and host controller 109 respectively described in connection with FIG. 1. The host 302 can be communicatively coupled to image sensors in the form of a front camera 330-1 and a back camera 330-N which can be generally referred to as the cameras 330 and be analogous to image sensor 230 described in connection with FIG. 2.

The host 302 can include a memory system 304 which can be analogous to memory system 104 described in connection with FIG. 1 and include multiple memory media types. As illustrated in FIG. 3, the memory system 304 can include memory media, such as memory media 312 including control circuitry 313 and an array of DRAM memory cells 305-1, memory media 314 including control circuitry 315 and array of SCM memory cells 305-2, and memory media 316 including control circuitry 317 and array of NAND memory cells 305-3 that can be analogous to memory media 112, 114, and 116, respectively, as described in connection with FIG. 1.

At least one of the plurality of memory media can include a quarantined location. As a non-limiting example as illustrated in FIG. 3, the array of each memory media can include a quarantined location. For example, the memory media 312, 314, and 316 can include quarantined locations 307-1 (included within the DRAM array 305-1), 307-2 (included within the SCM array 305-2), and 307-3 (included within the NAND array 305-3), respectively. Although FIG. 3 illustrates that a quarantined location is located as a portion of each memory media 312, 314, and 316, various and/or different locations of the memory media 312, 314, and/or 316 can be configured as a quarantined location. For example, one of the memory media 312, 314, and/or 316 can include a quarantined location, while other memory media 312, 314, and/or 316 do not include. For example, unlike how it is illustrated in FIG. 3, in which only a portion of the memory media is configured as a quarantined location, the entire memory media can be configured as a quarantined location.

The example host 302 is in the form of a mobile device (e.g., an IoT enabled device). An IoT enabled device can include mobile phones, smart phones, tablets, phablets, computing devices, implantable devices, vehicles, home appliances, smart home devices, monitoring devices, wearable devices, devices enabling intelligent shopping systems, among other cyber-physical systems. The cameras 330 can include multiple types of cameras (e.g., video or static) located on the mobile device host 302. The location and/or operation of the cameras 330 can be an attribute of the image data and be used to generate a setting. For example, image data (e.g., photographs) generated by the front camera 330-1 may have similar or different settings than the back camera 330-N.

For example, a user of the mobile device 302 may provide different input about photographs generated from the front camera 330-1. A photograph generated from the front camera 330-1 may be a photograph taken by the user of the user (e.g., a selfie) that the user does not desire that to be exposed to a public. Accordingly, a user may decide to store the photograph generated from the front camera 330-1 in one of quarantined locations 307-1, 307-2, and/or 307-3 of the memory media 312, 314, and/or 316. In contrast, photographs taken by the back camera 330-N may elicit different input. For example, photographs generated from the back camera 330-N may be of people, nature scenery, animals, object, etc. that the same user may not mind sharing the photographs to the public. Accordingly, a user may decide to store the photograph generated from the back camera 330-N in one of non-quarantined locations 307-1, 307-2, and/or 307-3 of the memory media 312, 314, and/or 316. Such a pattern derivable from those inputs can be applied by the host controller 309 and/or controller 310 such that the photograph taken by the front camera 330-1 can be automatically stored in one of the quarantined locations, while the photograph taken by the back camera 330-N can be automatically stored in one of the non-quarantined locations. Stated differently, a threshold of a setting applicable to data obtained via one sensor can be different from a threshold of the setting applicable to data obtained via another sensor.

The host controller 309 and/or the controller 310 can apply multiple settings to photographs (e.g., image data) received from one or more cameras 330 (e.g., image sensors). For example, a first setting can include a first threshold, and responsive to receiving a first image from one or more cameras 330 (e.g., images sensors) the host controller 309 and/or the controller 310 can determine if the first image is above or below a first threshold corresponding to the first setting. If the first image has attributes that are above the first threshold corresponding to the first setting, the host controller 309 and/or the controller 310 can write the first image to a non-quarantine location of memory media 312, 314, and/or 316. If the first image is below the first threshold corresponding to the first setting, the host controller 309 and/or the controller 310 can write the first image to a quarantined location of the memory media 312, 314, and/or 316.

Continuing with the previous example, a second setting can include a second threshold, and responsive to receiving a second image from one or more cameras 330 (e.g., images sensors) the host controller 309 and/or the controller 310 can determine if attributes of the second image is above or below a second threshold corresponding to the second setting. If the second image has attributes that are above the threshold corresponding to the second setting the host controller 309 and/or the controller 310 can write the second image to a non-quarantined location of the memory media 312, 314, and/or 316. If attributes of the second image are below the second threshold corresponding to the second setting the host controller 309 and/or the controller 310 can write the second image to a quarantined location of the memory media 312, 314, and/or 316.

These settings can operate in combinations thereof. For example, the host controller 309 and/or controller 310 can determine to write single image data to a quarantined location of the memory media 312, 314, and/or 316 unless the single image data satisfies all of multiple settings applied to the single image data (e.g., attributes of the single image data being above of all thresholds of multiple settings). As described herein, access to data stored in the quarantined location, such as quarantined locations 307-1, 307-2, and/or 307-3 can be entirely refrained and/or limited which can refrain applications (e.g., that may have been granted permission to access the data) from accessing the data stored in the quarantined location and protect the data against the undesirable exposure to a public.

In other embodiments, the host controller 309 and/or the controller 310 can refrain from writing the image data (e.g., deleting the image data) to a particular memory media type (e.g., memory media 312, 314, and/or 316) to be potentially deleted from the mobile device 302 responsive to review by a user. For example, the host controller 309 and/or the controller 310 can apply one or more settings to a plurality of photographs generated from one or more cameras 330. The plurality of photographs can be written as described above to particular memory media types based on the thresholds of the applied settings, and responsive to a determination that the attributes of a portion of the plurality of photographs are not desired the host controller 309 and/or the controller 310 can write the data to a particular memory media type (e.g., NAND 316) to be reviewed by a user of the mobile device 302 for deletion.

Figure 4:
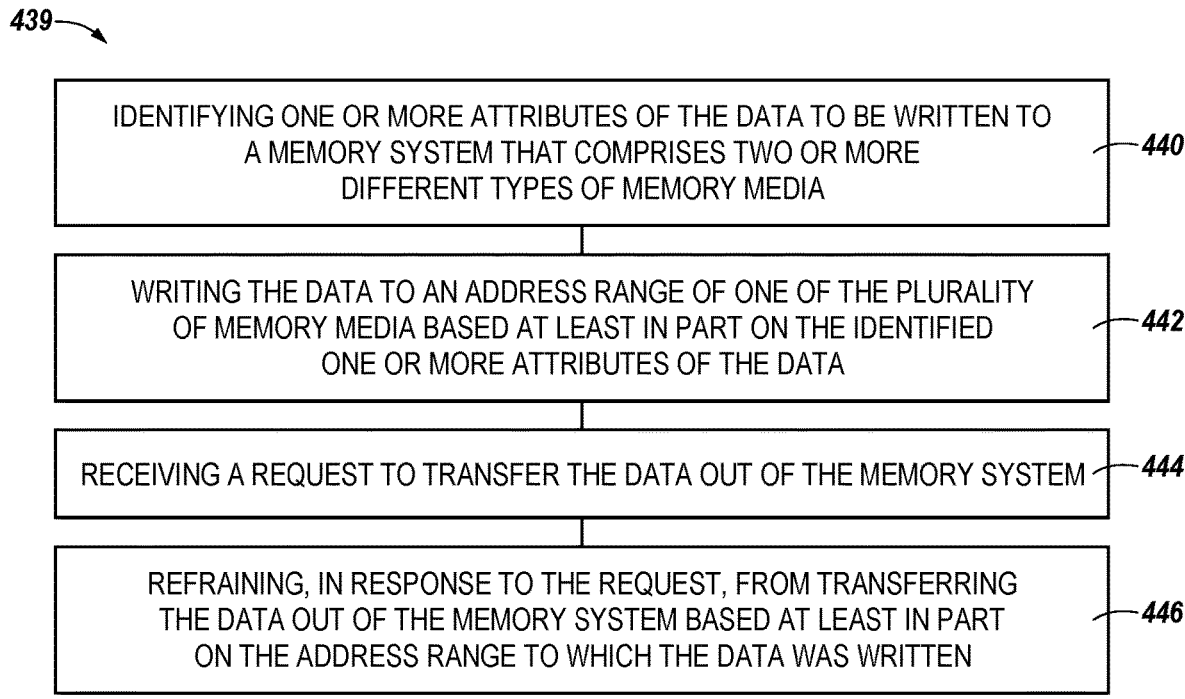

FIG. 4 is a flow diagram 439 of a method for accessing data stored in quarantined memory media in accordance with a number of embodiments of the present disclosure. At 440, data can be received at a memory system (e.g., memory system 104, 204, and/or 304 as described in connection with FIGS. 1, 2, and 3, respectively). As described herein, the memory system can include a plurality of memory media having various types, and at least two of the plurality of memory media can be different types of memory media (e.g., DRAM, SCM, and/or NAND as described in connection with FIGS. 1, 2, and/or 3).

At 442, one or more attributes of the data received at the memory system can be identified, for example, by a controller. The controller can be analogous to a controller such as controller 110, 210, and/or 310 as described in connection with FIGS. 1, 2, and 3. As described herein, the attributes identified by the controller can be compared to threshold(s) of one or more settings.

At 444, the data can be written, in response to the one or more attributes of the data being identified, to an address range corresponding to a particular location (e.g., of the plurality of memory media) that is quarantined (also referred to as a quarantined location). As described herein, the particular location is quarantined in a sense that a request to access data stored in the quarantined location is limited. Accordingly, at 446, even when a request to transfer the data out of the memory system is received (e.g., at the controller), the data can be refrained from being transferred out of the memory system since the data is written to the quarantined location of the plurality of memory media. For example, the data can be refrained from being uploaded to a social networking service (SNS) and/or being (e.g., automatically) synchronized on a cloud system.

In some embodiments, although the data written to the quarantined location may still be refrained from being transferred out of the memory system, the data can be allowed to be transferred within the memory system. For example, the data written to the quarantined location can be transferred to another location within a same memory media and/or different media, and/or different components such as control circuitry, controller, and/or a host controller.

In some embodiments, the controller can determine, based on attributes of data, the data to be written to an address range corresponding to a different location that is not quarantined (also referred to as non-quarantined location). In response to receiving a same request (e.g., request to access transfer the data out of the memory system), the data can be allowed to be transferred out of the memory system.

Figure 5:
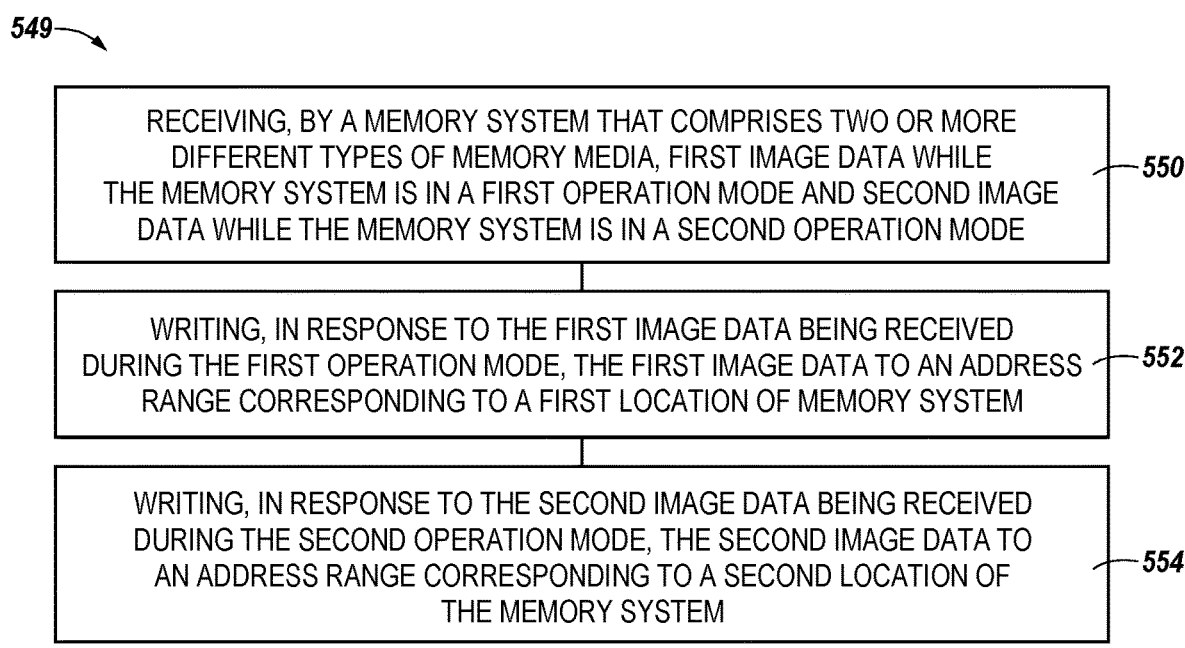

FIG. 5 is a flow diagram 549 of a method for accessing data stored in quarantined memory media in accordance with a number of embodiments of the present disclosure. At 550, first image data and second image data can be received by a memory system (e.g., memory system 104, 204, and/or 304 as described in connection with FIGS. 1, 2, and 3, respectively). As described herein, the memory system can include a plurality of memory media having various types and at least two of the plurality of memory media can be different types of memory media (e.g., DRAM, SCM, and/or NAND as described in connection with FIGS. 1 and 2). In this example, the first image data is received while the memory system is in a first operation mode, and the second image data is received while the memory system is in a second operation mode.

At 552, the first image data that is received while the memory system is in the first operation mode can be written to an address corresponding a first location of the plurality of memory media. At 554, the second image data that is received while the memory system is in the second operation mode can be written to an address range corresponding to a second location of the plurality of memory media. The second location where the second image data is or is to be written to can be quarantined (e.g., a quarantined location) such that a request to access data stored in the second location is limited. Accordingly, in response to receiving a request to transfer the second image data out of the memory system, the second image data can be refrained from being transferred out of the memory system. In contrast, in response to receiving a request to transfer the first image data out of the memory system, the first image data can be allowed to be transferred out of the memory system.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    identifying one or more attributes of image data to be written to a memory system that comprises two or more different types of memory media;
    writing the image data to an address range of one of the plurality of memory media in response to the identified one or more attributes of the data being less than a threshold, wherein a particular location corresponding to the address range is quarantined such that a request to access data written to the particular location is limited;
    receiving a request to transfer the data out of the memory system; and
    refraining, in response to the request, from transferring the data out of the memory system based at least in part on the address range to which the data was written;
    wherein the method further comprises; receiving one or more inputs indicating whether the image data with the one or more attributes is to be written to the quarantined location or a non-quarantined location of at least one of the plurality of memory media;
identifying a pattern underlying the one or more inputs; and
adjusting the threshold based on the pattern.

2. The method of claim 1, further comprising:
identifying one or more attributes of different data to be written to the memory system;
writing to a different address range of the plurality of memory media based at least in part on one or more attributes of the different data;
receiving a command to read the different data from the memory system; and
allowing the different data to be read from the memory system based at least in part on the different address range to which the different data was written.

3. The method of claim 1, further comprising:
receiving a command to move the image data to a location corresponding to a different address range;
allowing, in response to receiving a request to transfer the image data to a different location of the memory system, the image data to be transferred to the different location of the memory system.

4. The method of claim 1, wherein refraining, in response to the image data being written to the particular location, the image data from being transferred out of the memory system comprises refraining the image data from being uploaded to a social networking service (SNS).

5. The method of claim 1, wherein refraining, in response to the image data written to the particular location, the image data from being transferred out of the memory system comprises refraining the image data from being automatically synchronized on a cloud system.

6. The method of claim 1, wherein the image data is image data received from an image sensor coupled to the memory system.

7. A method, comprising:
receiving, by a memory system that comprises two or more different types of memory media, first image data and second image data;
writing, in response to the first image data being received while the memory system is in a first operation mode or in response to one or more attributes of the first image being not less than a threshold, the first image data to an address range corresponding to a first location of memory system;
writing, in response to the second image data being received while the memory system is in a second operation mode or in response to one or more attributes of the second image being less than a threshold, the second image data to an address range corresponding to a second location of the memory system, wherein the second location is quarantined such that a request to access data written to the second location is limited;
identifying a pattern underlying respective one or more inputs indicating whether the first image or the second image, or both, is to be written to the first location or the second location; and
adjusting the threshold based on the pattern.

8. The method of claim 7, further comprising allowing, in response to receiving a request to transfer the first image data out of the memory system, the first image data to be transferred out of the memory system.

9. The method of claim 7, further comprising refraining, in response to receiving a request to transfer the second image data out of the memory system, the second image data from being transferred out of the memory system.

10. An apparatus, comprising:
a plurality of memory media that comprises two or more different types of memory media; and
a controller coupled to the plurality of memory media, wherein the controller is configured to:
receive a plurality of image data;
write first image data of the plurality of image data to an address range corresponding to a first location of the plurality of memory media in response to one or more attributes of the first image data being not less than a threshold;
write second image data of the plurality of image data to an address range corresponding to a second location of the plurality of memory media in response to one or more attributes of the second image data being not less than a threshold;
in response to receipt of a request to transfer the plurality of image data out of the apparatus:
allow, in response to the first image data written to the first location, the first image data to be transferred out of the apparatus; and
refrain, in response to the second image data written to the second location, the second image data from being transferred out of the apparatus;
wherein the controller is further configured to:
identify a pattern underlying one or more inputs received in association with the first image, or the second image, or the both indicating whether the first image, or the second image, or the both is to be written to the first location or the second location; and
adjust the threshold based on the pattern.

11. The apparatus of claim 10, wherein the controller is configured to allow, in response to a request to transfer the second image data to a different location of the apparatus, the second image data to be transferred to the different location.

12. The apparatus of claim 10, wherein the request to transfer the plurality of image data out of the apparatus is a request to transfer the plurality of image data to a different memory device located external to the apparatus.

13. The apparatus of claim 12, wherein the different memory device is a network attached storage (NAS) device.

14. The apparatus of claim 12, wherein the different memory device is located in a data center.

15. The apparatus of claim 10, wherein the first location and the second location of the plurality of memory media are located in a first memory media of the plurality of memory media.

16. The apparatus of claim 10, wherein:
the first location of the plurality of memory media is located in a first memory media of the plurality of memory media; and
the second location of the plurality of memory media is located in a second memory media of the plurality of memory media.

17. The apparatus of claim 10, wherein the plurality of memory media includes dynamic random-access memory (DRAM), storage class memory (SCM), or NAND, or combination thereof.

18. An apparatus, comprising:
a plurality of memory media, wherein:
the plurality of memory media have two or more different types of memory media; and
at least one of the plurality of memory media comprises a quarantined location to limit a request to access data written to the quarantined location limited; and a controller coupled to the plurality of memory media, wherein the controller is configured to:

receive image data;

write the image data to an address range corresponding to the quarantined location of the at least one of the plurality of memory media in response to one or more attributes of the image data being less than a threshold; and reject a request to transfer the image data out of the apparatus such that the image data is refrained, while the image data is allowed to be transferred within the apparatus, from being transferred out of the apparatus;

wherein the controller is further configured to:

receive one or more inputs indicating whether the image data with the one or more attributes is to be written to the quarantined location or a non-quarantined location of at least one of the plurality of memory media;

identify a pattern underlying the one or more inputs; and adjust the threshold based on the pattern.

19. The apparatus of claim 18, wherein each of the plurality of memory media comprises a respective quarantined location.

20. The apparatus of claim 18, wherein at least one of the plurality of memory media comprises a non-quarantined location, and wherein data written to the non-quarantined location is not refrained from being transferred out of the apparatus.

21. The apparatus of claim 20, wherein each of the plurality of memory media comprises a respective non-quarantined location.

22. The apparatus of claim 20, wherein the received image data is automatically transferred to and written, absent an indication that the image data is to be written to an address range corresponding to the non-quarantined location, to the quarantined location of the at least one of the plurality of memory media.

23. The apparatus of claim 20, wherein the received image data is automatically transferred to and written, absent an indication that the image data is to be written to an address range corresponding to the quarantined location, to the non-quarantined location of the at least one of the plurality of memory media.

* * * * *